Figure 1:
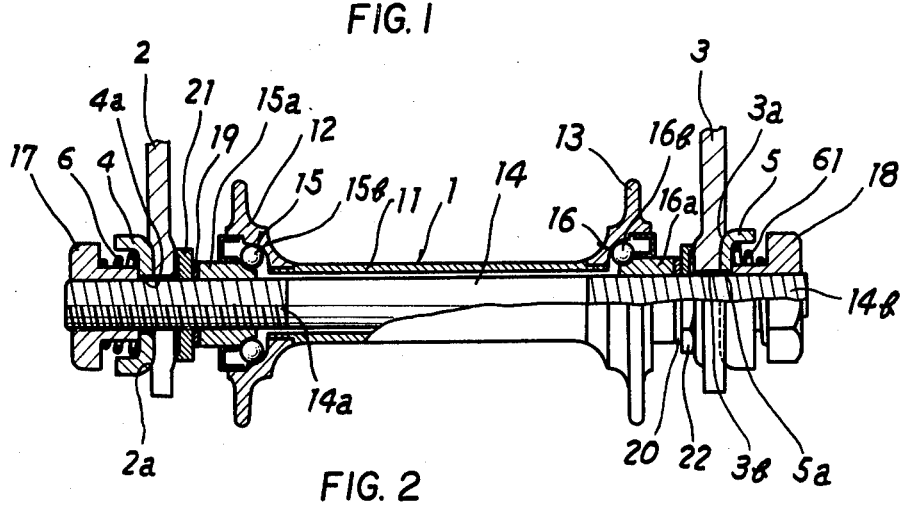

United States Patent [19]

Segawa

[11] 4,079,958
[45] Mar. 21, 1978

[54] HUB ANTI-ESCAPE DEVICE FOR A BICYCLE

[75] Inventor: Takashi Segawa, Sakai, Japan

[73] Assignee: Shimano Industrial Company Limited, Osaka, Japan

[21] Appl. No.: 653,521

[22] Filed: Jan. 29, 1976

[51] Int. Cl.² .................................................. B62K 25/00
[52] U.S. Cl. ...................................... 280/279; 280/288; 301/11
[58] Field of Search ................. 301/105 B, 111, 112, 301/114, 124 R, 128; 280/279, 288; 308/192; 151/38

[56] References Cited

U.S. PATENT DOCUMENTS

| 3,325,196 | 6/1967 | Noirot | 151/38 X |
| 3,507,516 | 4/1970 | Fritz | 280/279 |
| 3,610,659 | 10/1971 | Gerarde | 280/279 |

FOREIGN PATENT DOCUMENTS

| 58,772 | 11/1953 | France | 301/111 |
| 408,298 | 12/1944 | Italy | 301/111 |
| 417,669 | 1/1947 | Italy | 280/279 |
| 421,022 | 5/1947 | Italy | 280/288 |
| 452,295 | 10/1949 | Italy | 301/111 |
| 457,547 | 5/1950 | Italy | 280/288 |
| 460,058 | 10/1950 | Italy | 301/111 |

Primary Examiner—Robert B. Reeves
Assistant Examiner—Charles A. Marmor
Attorney, Agent, or Firm—Stevens, Davis, Miller & Mosher

[57] ABSTRACT

A hub anti-escape device for a bicycle having a pair of supports, preferably dish-like shaped, which are inserted over a main shaft of a hub for the bicycle to be engageable with portions formed at the outer surfaces of a pair of fork ends of the bicycle frame respectively and subjected to a resistance above a given amount against movement of the supports in the radial direction, i.e., the direction in which the main shaft comes off the fork ends. A spring, mounted on the outside of at least one of the supports, urges the support towards the outer surface of the fork end, and is compressed with tightening structure for the hub, so that the device is adapted to prevent the escape of the main shaft from the two supports by the engagement of each of the supports with each of the fork ends even when the tightening structure loosens or the main shaft is not completely secured.

1 Claim, 7 Drawing Figures

U.S. Patent  March 21, 1978  Sheet 1 of 3  4,079,958

HUB ANTI-ESCAPE DEVICE FOR A BICYCLE

This invention relates to a hub anti-escape device for a bicycle and more particularly to an anti-escape device for a hub mounted to a pair of fork ends of a bicycle frame by means of a tightening means.

Generally, a hub for a bicycle is adapted to be mounted to a bicycle frame in a manner that a main shaft, which extends through a hub shell at the center thereof, is inserted into a pair of fork ends of a bicycle frame, so that both ends of the main shaft, which protrude from the fork ends, are secured to the bicycle frame by means of tightening means mainly composed of tightening nuts.

The tightening nuts frequently loosen by vibrations or the like in the bicycle's running to cause removal of the hub from the bicycle frame during running. Such removal occurs frequently with a quick release hub.

A hub means, the so-called quick release hub, includes a main shaft comprising a tubular shaft and a rod extending therethrough. The rod is screwed at one end with an adjusting nut and provided at the other end with a tightening means, such as a cam. The cam is adapted to be turned to axially shift the rod for reducing the distance between the nut and the cam or a holder therefor so that the main shaft may be attached to the pair of fork ends with the adjust nut and holder, or quickly removed therefrom by means of a reverse turn of the cam.

The quick release hub, which has hitherto been used mainly for quick replacement of a wheel of a racing bicycle, has recently been used also for an ordinary bicycle.

Since a racer will properly handle the quick release hub at a race track or the like, it is rare that his incomplete control of the cam causes escape of the hub from the fork ends. However, an nonprofessional operator often improperly controls the cam to cause the hub to come off, resulting in a failure of removal of the bicycle wheel.

This invention has been designed to eliminate the aforesaid drawbacks in the quick release hub as well as a conventional one.

An object of the invention is to provide a hub anit-escape device for a bicycle for preventing the main shaft from escaping out of the fork ends of a bicycle frame even if the shaft is subjected to vibrations in running of the bicycle or if a tightening means for a hub is not completely tightened.

Namely, the hub anti-escape device for a bicycle in accordance with the invention is adapted to have an engaging portion at each of a pair of fork ends, a pair of supports preferably dish-like shaped to be engageable with the engaging portions respectively so that the engagement therebetween may produce a resistance above a given value against the movement of the supports in the radial direction thereof, i.e., in the direction of escape of the main shaft. The supports are inserted on the main shaft of the hub, and a spring is provided at at least one of the outer sides of the supports so as to urge the support towards the outer surface of the support so that the spring may be compressed when the main shaft is secured to the fork ends by means of the tightening means for the hub, whereby both the urging of the spring and the engagement of the support with the outer surface of the fork end can prevent the main shaft from coming off the pair of fork ends even if the tightening means loosens or the main shaft is incompletely secured to the latter.

In addition, the main shaft of the hub for a bicycle in accordance with the invention extends through the center of a hub shell and rotatably supports the hub shell therewith through a pair of bearings. The main shaft may be in the form of a solid rod or composed of a tubular shaft and a rod extending therethrough. Also, the tightening means is provided and generally comprises a tightening nut, in an ordinary hub, screwed with the main shaft thereof and a cam or a nut, in a quick release hub, mounted to or screwed with the rod. Furthermore, a hub anti-escape device of the invention is applicable for a front hub used in a front wheel of a bicycle and a rear hub in a rear wheel as well, where the hub is not limited in its kind, type and size.

Figure 2:
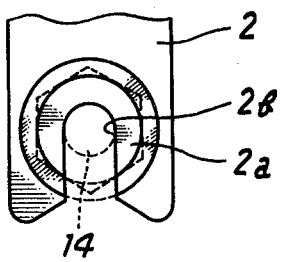
Figure 3:
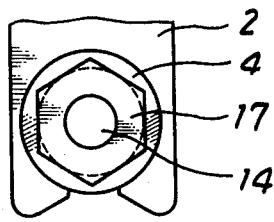
Figure 4:
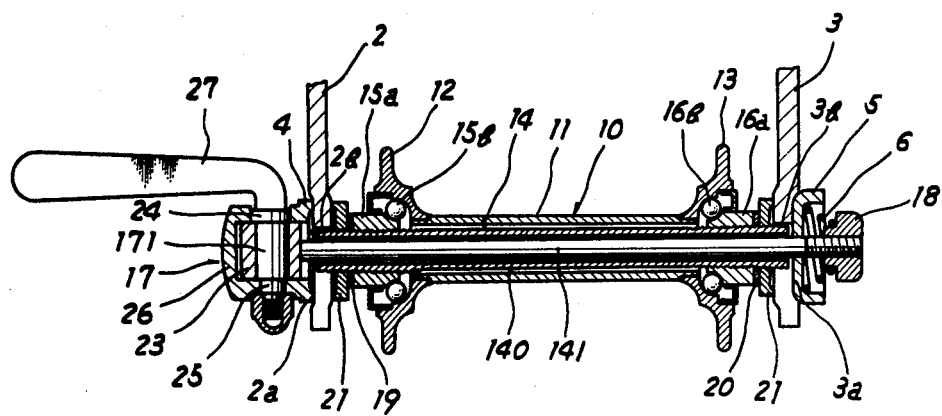
Figure 5:
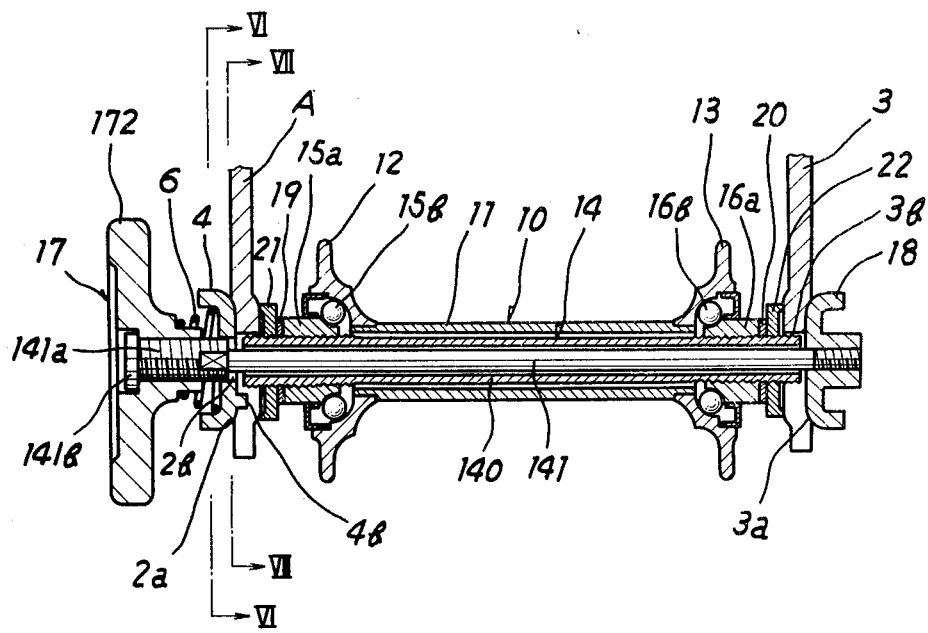
Figure 6:
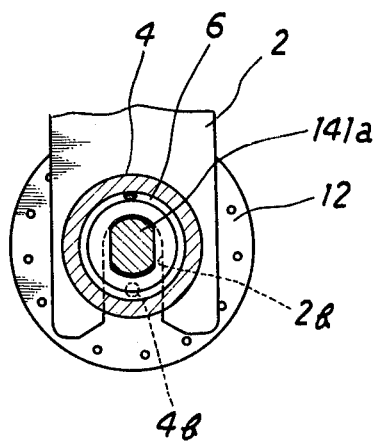
Figure 7:
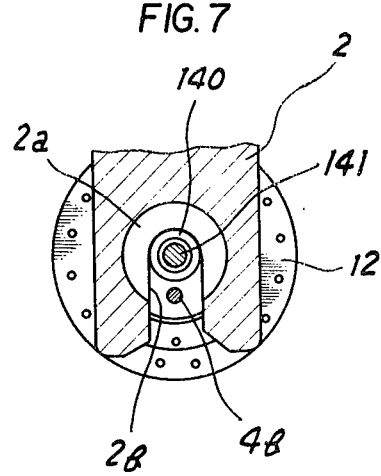

Further objects and characteristics of the invention will be apparent from the following description, reference being had to the accompanying drawings wherein preferred forms of the present invention are clearly shown. In the drawings:

FIGS. 1 to 3 show a hub anti-escape device of the invention applied to an ordinary hub for a bicycle, FIG. 1 is a partially cutaway front view thereof, FIG. 2 is a front view of a fork end of a bicycle frame, FIG. 3 is a side view showing the hub attached to the fork end, FIGS. 4 and 5 are partially cutaway front views showing the hub anti-escape devices applied to a quick release hub respectively, FIG. 4 shows the device including a cam as a tightening means, FIG. 5 shows the device including a screw member, FIG. 6 is a sectional view taken on Line VI—VI in FIG. 5, and FIG. 7 is a sectional view taken on Line VII—VII in FIG. 5.

Referring to FIG. 1, the reference numeral 1 denotes a generally well known hub for a bicycle, which hub comprises a hub shell 11, flanges 12, 13 having bores for attaching spokes thereto and fixed to both axial ends of the hub shell 11, a main shaft 14 formed of a solid rod and extending through the hub shell 11, a pair of bearings 15 and 16 for rotatably supporting the hub shell 11 to the main shaft 14, and tightening means 17 and 18 for securing the main shaft 14 to a pair of fork ends 2 and 3 of a bicycle frame.

The bearings 15 and 16 comprise ball holders 15a and 16a and balls 15b and 16b respectively, which ball holders 15a and 16a are screwed onto threads 14a and 14b, on the main shaft 14. The balls 15b and 16b are in abutment against ball races at the interior of the flanges 12 and 13 respectively. The hub shell 11 is rotatably supported to the main shaft through the balls 15b and 16b.

The tightening means 17 and 18 are composed of tightening nuts screwed onto the threads 14a and 14b on the main shaft 14 respectively. The well known hub has its main shaft secured to the fork ends 2 and 3 by tightening the nuts in a manner that the inner face of each of the nuts abuts the outer surface of each of the fork ends, and lock nuts 21 and 22 are screwed onto the main shaft at the outside of each of the ball holders 15a and 16a through washers 19 and 20 so that the fork ends 2 and 3 may be secured with both and be interposed between the tightening and the lock nuts.

Being hitherto described, the construction of the well known ordinary hub is not novel or essential to the invention.

This invention is directed to prevent the abovementioned ordinary hub from needlessly coming off the fork ends 2, 3. Namely, the fork ends 2 and 3 are provided at the outer surfaces thereof with engaging portions 2a and 3a respectively. A pair of supports 4 and 5 are provided to be engaged with the engaging portions 2a and 3a so as to be applied with a resistance above a given value against displacement of the supports in the radial direction thereof, i.e., in the direction of escape of the main shaft 14 from the fork ends. At the center of each of the supports 4 and 5 is formed a bore of a larger diameter than that of the main shaft 14. The main shaft 14 extends through the bores in the supports 4 and 5. Springs 6 and 61 urge the supports 4 and 5 towards the outer surfaces of the fork ends respectively. Thus, the tightening means 17 and 18 are tightened to compress the springs 6 and 61 so that the reaction thereof may urge the supports 4 and 5 towards the outer surfaces of the fork ends 2 and 3 respectively.

In addition, the fork ends 2 and 3, which are attached to the extremities of the bicycle frame and are regularly spaced from each other include, as shown in FIG. 2, one-side-open bores 2b and 3b receiving thereinto the main shaft 14. The aforesaid hub 1 is interposed between the bores 2b and 3b. The main shaft 14 extends at both ends through the bores 2b and 3b and is secured to the fork ends 2 and 3 with the tightening means 17 and 18. Also, the fork ends 2 and 3 are, as shown in FIG. 2, recessed at the outer surfaces thereof around the bores 2b and 3b so as to form the aforesaid engaging portions 2a and 3a respectively, or are, not shown, provided with a plurality of horizontally formed knurlings. The engaging portions 2a and 3a serve to hold the supports 4 and 5 in combination with the urging of each of the springs 6 and 61 even when the tightening means 17 and 18 loosen so that the main shaft 14 may be prevented from coming out of the open side of each of the bores 2b and 3b. The holding with each of the supports 4 and 5 depends upon the urging of each of the springs 6 and 61. Also, the engaging portions 2a and 3a are so formed that a resistance may be applied thereto for holding the main shaft against the force of gravity from the weight of a bicycle frame when the bicycle is lifted.

The supports 4 and 5 in engagement with the engaging portions 2a and 3a are, as shown in FIG. 1, formed mainly in a dish-like shape respectively. The supports 4 and 5 are brought, at the bottoms thereof, into contact with the outer surfaces of the fork ends 2 and 3 respectively so that when the engaging portions 2a and 3a are positioned in the aforesaid recesses, the bottoms of the supports 4 and 5 are equal to or slightly smaller in diameter than the recesses respectively. Incidentally, when the engaging portions 2a and 3a are knurled the outer bottoms of the supports 4 and 5 are also preferably knurled.

The springs 6 and 61 for urging the supports 4 and 5 towards the fork ends 2 and 3 respectively are formed as coil springs and are preferably coiled in frustums. Each of the coil springs 6 and 61 is brought at one end thereof into contact with the outside of each of the supports 4 and 5 and retained at the other end to each of the tightening means.

The springs 6 and 61 are not necessary to be, as shown in FIG. 1, provided at both the supports 4 and 5. It is sufficient to provide at least one of the springs at the support 4 or 5. However, when the springs 6 and 61 are, as shown in FIG. 1, attached correspondingly to the supports 4, the tightening means 17 and 18 can easily be controlled while the springs 6 and 61 are compressed.

The elastic force of each of the springs 6 and 61 is settled relative to the frictional resistance between each of the engaging portions 2a and 3a at the fork ends 2 and 3 and each of the supports 4 and 5, with which the main shaft is, as aforesaid, restricted from coming out of the bores 2b and 3b due to the weight of the bicycle wheel even if the tightening means 17 and 18 is loosened to reduce the tightening torque thereof.

The hub anti-escape device constructed as aforesaid is applied to a hub 1 for a bicycle in a manner that the supports 4 and 5 are, as abovementioned, inserted to the main shaft 14 from both ends thereof and the springs 6 and 61 are applied to the exterior of the supports to be retained at each of their outer ends to the tightening means 17 and 18 respectively. The hub 1 is so supported to the fork ends 2 and 3 that the main shaft 14 of the hub 1 is inserted into the bores 2b and 3b at the fork ends 2 and 3, the supports 4 and 5 are engaged with the engaging portions 2a and 3a at the fork ends 2 and 3, and thereafter the tightening means 17 and 18 are turned to secure the main shaft 14 to the fork ends while the springs 6 and 61 are compressed.

In case the hub 1 is mounted to the bicycle frame by means of the hub anti-escape device of the invention, the reaction of each of the compressed springs 6 and 61 urges each of the tightening means 17 and 18 outwardly so as not to loosen during the bicycle's running. In case the tightening means 17 and 18 are loosened to the extent that their tightening forces are insufficient to hold the main shaft, the supports 4 and 5 in engagement with the engaging portions 2a and 3a at the fork ends 2 and 3 and urged thereto by means of the springs 6 and 61, function to hold the main shaft 14 and to prevent it from coming out of the bores 2b and 3b.

Next, the hub anti-escape device of the invention applicable to a quick release hub will be described.

Referring to FIGS. 4 and 5, the reference numeral 10 denotes a quick release hub which is constructed as follows. A main shaft of the hub denoted by the reference numeral 14 corresponding to the main shaft of the aforesaid ordinary hub 1, is formed of a tubular shaft 140 and a rod 141. The tubular shaft 140 is made substantially equal in length to the distance between the fork ends 2 and 3 and the rod 141, which is longer than the shaft 140, is provided at its one end with an adjust nut 18 associated with a tightening means and is provided at the other end with a tightening means 17 formed of a cam or a screw means. The tightening means 17 is controlled to axially move the rod 141 to shorten the distance between the adjust nut 18 and the tightening means 17 so that the rod 141 may be fixed to the fork ends 2 and 3.

The hub in FIG. 4 includes a cam 171 and that in FIG. 5 includes a screw means as the tightening means 17.

Firstly, in the hub 10 shown in FIG. 4, the cam 171 is, as well known, rotatably mounted to a short cylinder 23 which is fixed to one end of the rod 141 in the relation that the axes of both the cylinder and the rod are normal to each other. The cam 171 is provided with axles 24 and 25 which are not co-axial with the cam 171 and supported to a holder 26. To the eccentric axle 24 is connected a lever 27 which is turned to move the rod 141 leftward in FIG. 4.

The hub anti-escape device is mounted to the aforesaid quick release hub 10 by placing the support 5 and the spring 6 over one end thereof. The spring 6 is seated at its outer end to the adjust nut 18, the support 5 is in engagement with one side outer surface of the fork end 3, and the other support 4 is assembled integrally with the holder 26. However, the support 4 may, as in the embodiment of FIGS. 1-3, be formed independently of the holder 26.

The aforesaid quick release hub is mounted between the fork ends 2 and 3 in a manner that the tubular shaft 140 on the main shaft 14 is inserted at both ends thereof into the bores 2b and 3b, the support 5 is allowed to be engaged with the engaging portion 3a, the support 4 assembled with the holder 26 is allowed to be engaged with the engaging portion 2a, and then the lever 27 is turned to rotate the cam 171 for shifting the rod leftward in FIG. 4 so that both the support 4 assembled with holder 26 and the support 5 may be pushed towards the outer surface of each of the fork ends 2 and 3, whereby the hub is mounted to the fork ends. In this instance, proper rotation of the cam 171 by a turn of the lever 27 of course rigidly fixes the hub 10 to the fork ends. However, even if the rotation is not complete, the spring 6 urges the support 4 assembled in the holder 26 towards the outer surface of the fork end 2 so that both the supports 4 and 5 may be brought into close contact with the fork ends 2 and 3. The biasing force of the spring 6 is strong enough to hold the bicycle wheel on the forkends against the force of gravity from the weight thereof so that the hub 10 does not come off the fork ends 2 and 3.

In addition, since the adjust nut 18 is outwatedly urged by reaction of the compressed spring 6, the thread of the former can be rigidly mated with that of the rod 141. Thus the nut 18 is kept in its adjusted position and further its adjustment need not be accurate.

Secondly, the quick release hub in FIG. 5, including a screw member as the tightening means, will be described as follows. The quick release hub 10 has the tightening means 17 of the screw member substituted for the cam 171. The screw member has a knob 172 and is screwed to a threaded portion 141a of enlarged diameter at one end of the rod 141. For convenience of description, the screw member will hereinafter be denoted with the same reference numeral 17 as that of the tightening means.

The formation of the enlarged diameter threaded portion 141a of the rod 141 aims at rigidly, exactly screwing the screw member 17 therewith. The threaded portion 141a is provided at its innermost end with two parallel faces formed by cutting as shown in FIG. 6 and is provided at the outermost end, as shown in FIG. 5, with a flange 141b for preventing unscrewing of the screw member 17 from the thread 141a.

The above quick release hub 10 may be applied with the hub anti-escape device of the invention as in the aforesaid application. However for a fuller understanding, the modified embodiment of the application will now be described.

In the modified embodiment, the adjust nut 18 at one end of the rod 141 is dish-like shaped to be formed in one support 5, and the coil spring 6 is inserted between the screw member 17 and the support 4 separate therefrom.

In addition, the support 4, which is dish-like shaped as in the former embodiment, includes a center bore 4a of a substantially square shape coincident with the aforesaid innermost end of the enlarged diameter threaded portion 141a of the rod 141 and a projection 4b formed at a lower portion of the outer bottom of the support 4 and extending into the one-side-open bore 2b at the fork end 2 to make the support 4 non-rotatable with respect to the fork end 2. The projection 4b is located within the above one-side-opening bore 2b so as abut the inner face thereof, whereby the rod 141 is restricted from rotation through the support 4. The insertion of the square end of the rod 141 into the bore 4a and the abutment of the projection 4b against the inner face of the bore 2b makes it possible to turn the screw member 17 with respect to the rod 141 without relative rotation thereof.

Thus, the hub anti-escape device constructed as abovementioned can eliminate such a failure as escape of the hub 10 from the fork ends 2 and 3 even though insufficient screwing of the screw member 17 results in an incomplete tightening force thereof.

As clearly understood from the abovementioned description, the hub anti-escape device of the invention can reduce problems caused when the tightening means loosens by vibrations or the like in the bicycle's running, and also can hold, even with its lower tightening force, the main shaft to the fork ends by means of the engagement of the supports therewith and the urging of the springs to thereby exactly prevent the hub from coming off the bicycle frame.

Furthermore, in case that the hub anti-escape device of the invention is applied to a quick release hub, the hub can exactly be supported with the bicycle frame even with an incomplete tightening force of the tightening means comprising a cam or a screw member, so that the hub may be prevented from such a failure caused by unskilled operation that the hub is removed from the bicycle frame to result in removal of the wheel, whereby it is expected that the quick release hub will become popular.

In addition, it is unnecessary for the aforesaid quick release hub to be precisely adjusted of the adjust nut at the rod because the nut is always urged with the spring, whereby the hub anti-escape device of the invention has such advantages as to make simple the treatment of the hub and to prevent the adjust nut from loosening.

While preferable embodiments of the invention have been described using specific terms, such description is for illustrative purposes only, and it is to be understood that changes and variations may be made without departing from the spirit or scope of the following claims.

What is claimed is:

1. In combination with a bicycle frame comprising a fork having spaced ends with supporting bores therethrough, a hub positioned between said spaced ends; a main shaft comprising a tubular shaft and a threaded rod extending through said tubular shaft; said rod and tubular shaft extending through said hub with said tubular shaft terminating in said pair of supporting bores, said rod extending through said supporting bores, and an anti-escape device for said hub, said device comprising:

means defining a concave engaging portion on the exterior of said ends of said fork around the supporting bores;

a pair of supports positioned in said engaging portions, one of said supports having a bore defined therethrough of a diameter greater than that of said rod and having a projection extending axially therefrom, said projection being of smaller cross-sectional area than said contiguous supporting bore and being engageable therewith so as to be non-rotatable relative thereto, the other of said supports being screwed onto one axial end of said rod;

a screwable means on said rod adjacent the other axial end of the rod to tighten both of said supports against said concave engaging portions, said hub being releasable from the ends of said fork by loosening said screwable means; and a coil spring between said screwable means and the support having a projection, said rod having a non-circular in cross-section end at the end carrying the screwable means, and said last-mentioned support having a through bore non-circular in cross-section which fits around the non-circular end of said rod to make said rod non-rotatable.

* * * * *